US012311679B2

(12) United States Patent
Nomura

(10) Patent No.: US 12,311,679 B2
(45) Date of Patent: May 27, 2025

(54) PRINTING APPARATUS, PRINTING METHOD, PRINTING PROGRAM AND RECORDING MEDIUM

(71) Applicant: SCREEN HOLDINGS CO., LTD., Kyoto (JP)

(72) Inventor: Seiya Nomura, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 18/575,164

(22) PCT Filed: Jul. 19, 2022

(86) PCT No.: PCT/JP2022/027966
§ 371 (c)(1),
(2) Date: Dec. 28, 2023

(87) PCT Pub. No.: WO2023/008244
PCT Pub. Date: Feb. 2, 2023

(65) Prior Publication Data
US 2024/0308234 A1 Sep. 19, 2024

(30) Foreign Application Priority Data
Jul. 30, 2021 (JP) ................................ 2021-124972

(51) Int. Cl.
*B41J 2/21* (2006.01)

(52) U.S. Cl.
CPC .................................. *B41J 2/2121* (2013.01)

(58) Field of Classification Search
CPC . B41J 2/2121; B41J 2/195; B41J 2/205; B41J 2/01; B41J 2/04535; B41J 2/0454; B41J 2/04563; B41J 2/04571
See application file for complete search history.

(56) References Cited

U.S. PATENT DOCUMENTS

2006/0139389 A1 6/2006 Sakai
2008/0117467 A1 5/2008 Hosaka et al.
2012/0050363 A1 3/2012 Nagashima

FOREIGN PATENT DOCUMENTS

JP 2001-277484 A 10/2001
JP 2006-205717 A 8/2006
JP 2008-126453 A 6/2008
JP 2012-45836 A 3/2012
JP 2014-058091 A 4/2014
JP 2019-136927 A 8/2019

OTHER PUBLICATIONS

International Search Report received in International Application No. PCT/JP2022/027966, dated Aug. 30, 2022.

*Primary Examiner* — Kristal Feggins
(74) *Attorney, Agent, or Firm* — Rimon P.C.

(57) ABSTRACT

The size of the ink droplet to be ejected to each pixel P defined by the image data Di (ejection data) is corrected. Specifically, the size (quantity) of the ink droplet that the nozzle 52 ejects to the target pixel Pt is corrected based on a comparison between the size of the ink droplet that is to be ejected from the nozzle 52 to the preceding pixel Pa (first ejection condition) at timing T1 (first timing) and the size of the ink droplet that is to be ejected from the nozzle 52 to the target pixel Pt at timing T2 (second timing) (second ejection condition) (Steps S105 and S106). Thus, based on the size of the ink droplet to the preceding pixel Pa and target pixel Pt indicated by the image data Di, it is possible to respond to the situation where the effect of residual vibration is judged to be significant.

7 Claims, 16 Drawing Sheets

FIG.7

| PRECEDING INK DROPLET SIZE | SUBSEQUENT INK DROPLET SIZE | | |
|---|---|---|---|
| | S | M | L |
| S | EFFECT:SMALL | EFFECT:SMALL | EFFECT:SMALL |
| M | EFFECT:MODERATE | EFFECT:MODERATE | EFFECT:MODERATE |
| L | EFFECT:MODERATE | EFFECT:SIGNIFICANT | EFFECT:SIGNIFICANT |

FIG. 11A

<LESS THAN PREDETERMINED PERIOD>

| PRECEDING INK DROPLET SIZE | SUBSEQUENT INK DROPLET SIZE | | |
|---|---|---|---|
| | S | M | L |
| S | EFFECT:SMALL | EFFECT:SMALL | EFFECT:SMALL |
| M | EFFECT:SMALL | EFFECT:MODERATE | EFFECT:MODERATE |
| L | EFFECT:MODERATE | EFFECT:SIGNIFICANT | EFFECT:SIGNIFICANT |

FIG. 11B

<LONG THAN OR EQUAL TO PREDETERMINED PERIOD>

| PRECEDING INK DROPLET SIZE | SUBSEQUENT INK DROPLET SIZE | | |
|---|---|---|---|
| | S | M | L |
| S | EFFECT:SMALL | EFFECT:SMALL | EFFECT:SMALL |
| M | EFFECT:SMALL | EFFECT:SMALL | EFFECT:MODERATE |
| L | EFFECT:SMALL | EFFECT:MODERATE | EFFECT:MODERATE |

FIG. 12A

<HIGHER THAN OR EQUAL TO PREDETERMINED TEMPERATURE>

| PRECEDING INK DROPLET SIZE | SUBSEQUENT INK DROPLET SIZE | | |
|---|---|---|---|
| | S | M | L |
| S | EFFECT:SMALL | EFFECT:SMALL | EFFECT:SMALL |
| M | EFFECT:SMALL | EFFECT:MODERATE | EFFECT:MODERATE |
| L | EFFECT:MODERATE | EFFECT:SIGNIFICANT | EFFECT:SIGNIFICANT |

FIG. 12B

<LESS THAN PREDETERMINED TEMPERATURE>

| PRECEDING INK DROPLET SIZE | SUBSEQUENT INK DROPLET SIZE | | |
|---|---|---|---|
| | S | M | L |
| S | EFFECT:SMALL | EFFECT:SMALL | EFFECT:SMALL |
| M | EFFECT:SMALL | EFFECT:SMALL | EFFECT:MODERATE |
| L | EFFECT:SMALL | EFFECT:MODERATE | EFFECT:MODERATE |

PRINTING APPARATUS, PRINTING METHOD, PRINTING PROGRAM AND RECORDING MEDIUM

CROSS-REFERENCE TO RELATED APPLICATIONS

This application is the U.S. National Phase under 35 U.S.C. § 371 of International Application No. PCT/JP2022/027966, filed on Jul. 19, 2022, which claims the benefit of foreign priority to JP Patent Application No. 2021-124972 filed on Jul. 30, 2021, the entire contents of each of which are hereby incorporated by reference.

TECHNICAL FIELD

This invention relates to inkjet technology that controls the amount of ink droplet ejected from nozzles.

BACKGROUND

There is a known printing apparatus that prints an image on a printing medium by making ink droplet ejected from nozzles of an inkjet printhead land on the printing medium. As shown in Patent Literatures 1 and 2, such a printing apparatus can express the gradation of an image by adjusting the amount of ink droplet ejected from the nozzle in four steps: zero, small (S), medium (M), and large (L), for example.

CITATION LIST

Patent Literature

[Patent Literature 1] JP2008-126453
[Patent Literature 2] JP2012-045836
[Patent Literature 2] JP2001-277484

SUMMARY

Technical Problem

By the way, at the nozzle that ejects ink by the inkjet method, the ink meniscus formed at the nozzle vibrates as the ink is ejected, as shown in Patent Literature 3. That is, there is a residual vibration in the ink meniscus until a predetermined decay time has elapsed from the ink ejection. Therefore, if the residual vibration caused by the earlier ink droplet ejection affects the ejection of the later ink droplet, the ejection of the later ink droplet cannot be performed well. In particular, as described below, depending on the relationship between the ejection conditions (e.g., ink droplet volume) of the earlier ink droplet and those of the later ink droplet, the effect of residual vibration on the ejection of the later ink droplet may become significant.

The present invention is intended to solve the above-described problem, and it is an object of the present invention to enable good printing by suppressing the effects of residual vibrations of ink caused by ink droplet ejection from nozzles.

Solution to Problem

A printing apparatus according to the invention, comprises: an ejection head ejecting an ink droplet from a nozzle; and a control unit that controls the ejection of an ink droplet from the nozzle based on ejection data indicating ejection condition for ejecting an ink droplet from the nozzle to a target pixel to which the nozzle faces among pixels arranged at a pitch corresponding to a resolution, wherein the control unit performs a decision process to determine an amount of an ink droplet ejected by the nozzle at a second timing based on a comparison of a first ejection condition, which is the ejection condition when the nozzle ejects a droplet at a first timing, and a second ejection condition, which is the ejection condition when the nozzle ejects a droplet at the second timing after the time corresponding to the resolution has elapsed from the first timing.

A printing method according to the invention, comprises: step of acquiring an ejection data indicating an ejection condition for ejecting an ink droplet from a nozzle to a target pixel facing a nozzle among pixels arranged at a pitch corresponding to a resolution; and step of performing a decision process to determine an amount of an ink droplet ejected by the nozzle at a second timing based on a comparison of a first ejection condition, which is the ejection condition when the nozzle ejects a droplet at a first timing, and a second ejection condition, which is the ejection condition when the nozzle ejects a droplet at the second timing after the time corresponding to the resolution has elapsed from the first timing.

A Printing Program according to the invention causes a computer to execute following: step of acquiring an ejection data indicating an ejection condition for ejecting an ink droplet from a nozzle to a target pixel facing a nozzle among pixels arranged at a pitch corresponding to a resolution; and step of performing a decision process to determine an amount of an ink droplet ejected by the nozzle at a second timing based on a comparison of a first ejection condition, which is the ejection condition when the nozzle ejects a droplet at a first timing, and a second ejection condition, which is the ejection condition when the nozzle ejects a droplet at the second timing after the time corresponding to the resolution has elapsed from the first timing.

A recording medium according to the invention records the above printing program in a computer-readable manner.

That is, if ink solution is ejected continuously at the first and second timings, the residual vibration caused by an ejection of ink droplet at the first timing may affect an ejection of ink droplet at the second timing. In particular, as described below, depending on the relationship between the ejection conditions of the ink solution (first and second ejection conditions) at each of the first and second timings, the effect of such residual vibration could be significant.

In contrast, the invention (printing apparatus, printing method, printing program and recording medium) determines an amount of an ink droplet that is ejected by the nozzle at the second timing based on a comparison (in other words, a combination) of the first ejection condition and the second ejection condition indicated by the ejection data (decision process). Thus, based on the first and second ejection conditions indicated by the ejection data, it is possible to respond to situations where the effect of the residual vibration is judged to be significant. As a result, the effect of residual vibration of ink due to ink droplet ejection from nozzles can be suppressed to enable good printing.

The printing apparatus may be configured so that the control unit stores a reducing criterion for reducing an amount of an ink droplet ejected from the nozzle to the target pixel at the second timing from an amount indicated by the ejection data, and determines to reduce an amount of an ink droplet ejected by the nozzle at the second timing if a result of the comparison between the first ejection condition and the second ejection condition satisfies the reducing criterion in the decision process. In such a configuration, the situation where the effect of the residual vibration is determined to be significant based on the first and second ejection conditions indicated by the ejection data can be addressed by reducing an amount of an ink droplet that is ejected by the nozzle in the second timing. As a result, the effect of the residual vibration of ink due to ink droplet ejection from the nozzle can be suppressed and good printing can be achieved.

The printing apparatus may be configured so that the control unit determines to set an amount of an ink droplet ejected by the nozzle at the second timing to zero if a result of the comparison between the first ejection condition and the second ejection condition satisfies the reducing criterion in the decision process. In such a configuration, the situation where the effect of the residual vibration is determined to be significant based on the first and second ejection conditions indicated by the ejection data can be addressed by setting an amount of an ink droplet that is ejected by the nozzle in the second timing zero. As a result, the effect of the residual vibration of ink due to ink droplet ejection from the nozzle can be suppressed and good printing can be achieved. Here, setting an amount of an ink droplet ejected by the nozzle to zero means that the nozzle does not eject ink droplet.

The printing apparatus may be configured so that in the ejection head, a plurality of nozzles is provided, including the nozzle, and the nozzles eject ink droplets at different positions from each other, if it is decided in the decision process to reduce an amount of an ink droplet that is ejected by the nozzle at the second timing, the control unit increases an amount of an ink droplet ejected from an adjacent nozzle of the plurality of nozzles facing an adjacent pixel, which is a pixel adjacent to the target pixel, to the adjacent pixel from an amount indicated by the ejection data. That is, an amount of an ink droplet that adheres to the area including the target pixel may be insufficient due to a reducing in an amount of an ink droplet that is ejected by the nozzle at the second timing in order to suppress the effect of residual vibration. In contrast, by increasing an amount of an ink droplet ejected from an adjacent nozzle to an adjacent pixel of the target pixel, it is possible to complete the insufficient amount of an ink droplet and print a good image.

Various specific examples of ejection conditions that make the effect of the residual vibration significantly can be envisioned. Therefore, the printing apparatus may be configured so that the ejection condition indicates an amount of an ink droplet ejected from the nozzle to the target pixel.

The printing apparatus may be configured so that in the decision process, the control unit determines an amount of an ink droplet that is ejected by the nozzle at the second timing based on the comparison of the first ejection condition and the second ejection condition and the time interval between the first timing and the second timing. In such a configuration, it is possible to accurately respond to the effects of the residual vibration, which varies depending on the time interval between the first and second timing, and to achieve good printing.

The printing apparatus may be configured so that in the decision process, the control unit determines an amount of an ink droplet that is ejected by the nozzle at the second timing based on the comparison of the first ejection condition and the second ejection condition and an ink temperature. In such a configuration, it is possible to accurately respond to the effects of residual vibrations, which vary with the temperature of the ink, to achieve good printing.

Advantageous Effects of Invention

As described above, the present invention enables good printing by suppressing the effects of the residual vibrations of ink caused by ink droplet ejection from the nozzle.

BRIEF DESCRIPTION OF DRAWINGS

FIG. 7 shows the relationship between the size of two consecutively ejected ink droplets and the effect of residual vibration in table form.

FIG. 11A show the relationship between the size of two consecutively ejected ink droplets and the effect of the residual vibration in table form, FIG. 11B show the relationship between the size of two consecutively ejected ink droplets and the effect of the residual vibration in table form, FIG. 12A show the relationship between the size of two consecutively ejected ink droplets and the effect of the residual vibration in table form.

FIG. 12B show the relationship between the size of two consecutively ejected ink droplets and the effect of the residual vibration in table form.

DESCRIPTION OF EMBODIMENTS

Figure 1:
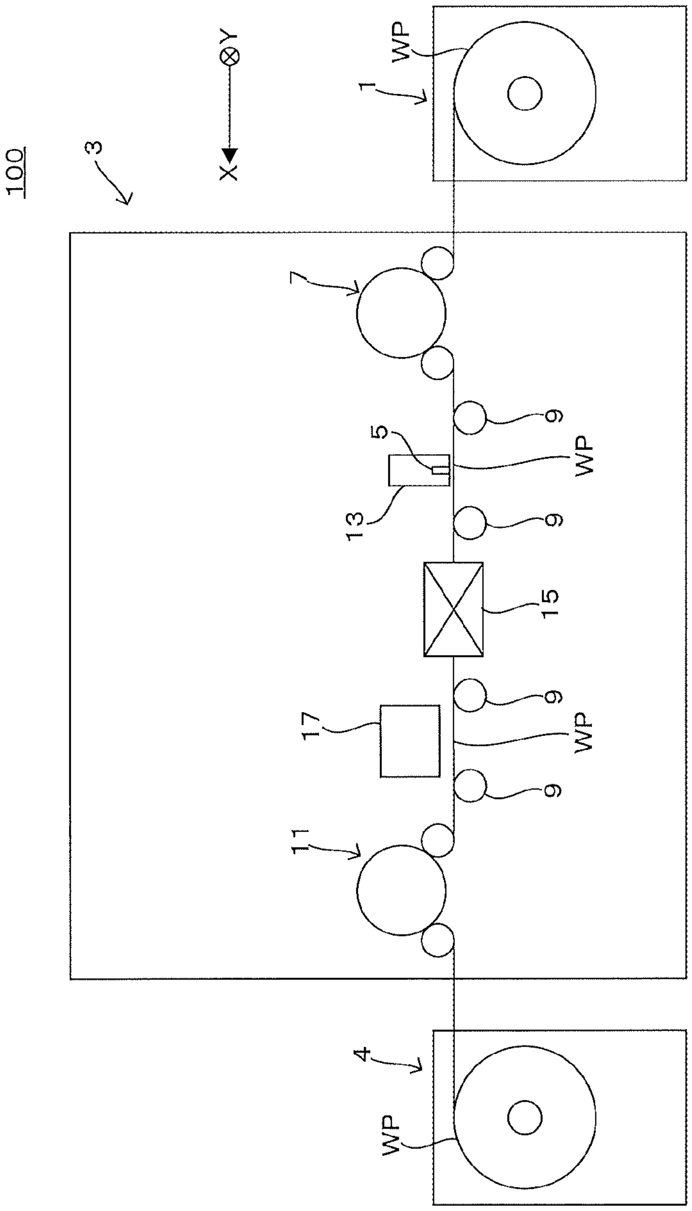
FIG. 1 is a front view schematically showing a printing system 100 equipped with an example of the printing apparatus of the present invention.

FIG. 1 is a front view schematically showing a printing system 100 equipped with an example of the printing apparatus of the present invention. In FIG. 1 and the following figures, the X-direction, which is the horizontal direction in which the fed unit 1, printing apparatus 3, and discharge unit 4, which are included in the printing system 100, are arranged, and the Y-direction, which is the horizontal direction orthogonal to the X-direction, are shown as necessary to clarify the arrangement relationship of each part of the apparatus.

As shown in FIG. 1, the printing system 100 comprises a feed unit 1, a printing apparatus 3, and a discharge unit 4. The feed unit 1 holds a printing medium WP that is a roll of continuous paper rotatablely around a horizontal axis. The feed unit 1 rolls out to supply the printing medium WP to printing apparatus 3. The printing apparatus 3 prints by ejecting ink onto the printing medium WP to form an image and sends the printing medium WP to the discharging unit 4. Discharge unit 4 winds the printed medium WP printed by printing apparatus 3 around the horizontal axis.

Here, the direction in which the printing medium WP is fed and conveyed by the feed unit 1 is the conveyance direction X. The horizontal direction orthogonal to the conveyance direction X is the width direction Y. The feed unit 1 described above is located upstream of the printing apparatus 3 in the conveyance direction X. The above-mentioned discharge unit 4 is located downstream of the printing apparatus 3 in the conveyance direction X.

The printing apparatus 3 has a driven roller 7 on the upstream side to take in the printing medium WP from the fed unit 1. Printing medium WP taken from feed unit 1 by driven roller 7 is sent to conveyance direction X by multiple conveyance rollers 9 and is conveyed downstream toward discharge unit 4. A driven roller 11 is located between the downstream-most conveyance roller 9 and the discharge unit 4. This driven roller 11 feeds the printing medium WP being conveyed on the conveyance roller 9 toward the discharge unit 4.

The printing apparatus 3 comprises a printing unit 13, a drying unit 15, and a line scanner 17 between the driven roller 7 and the driven roller 11, in that order along the conveyance direction X from the upstream. The printing unit 13 prints on printing medium WP. The drying unit 15 dries the printing medium WP printed by printing unit 13. The line scanner 17 inspects the printed area on the printing medium WP for stains, omissions, etc.

The printing unit 13 has an ejection head 5 with multiple nozzles that eject ink onto the printing medium WP. Multiple printing units 13 are generally arranged along the conveyance direction X of the printing medium WP. For example, a total of four printing units 13 of black (K), cyan (C), magenta (M), and yellow (Y) are provided. However, in the following explanation, described is an example in which the printing apparatus 3 is equipped with only one printing unit 13. The printing unit 13 has a length that exceeds the width of the printing medium WP in the width direction Y of the printing medium WP. The printing unit 13 has enough ejection heads 5 to print the print area in the width direction of the printing medium WP without moving in the width direction Y.

Figure 2:
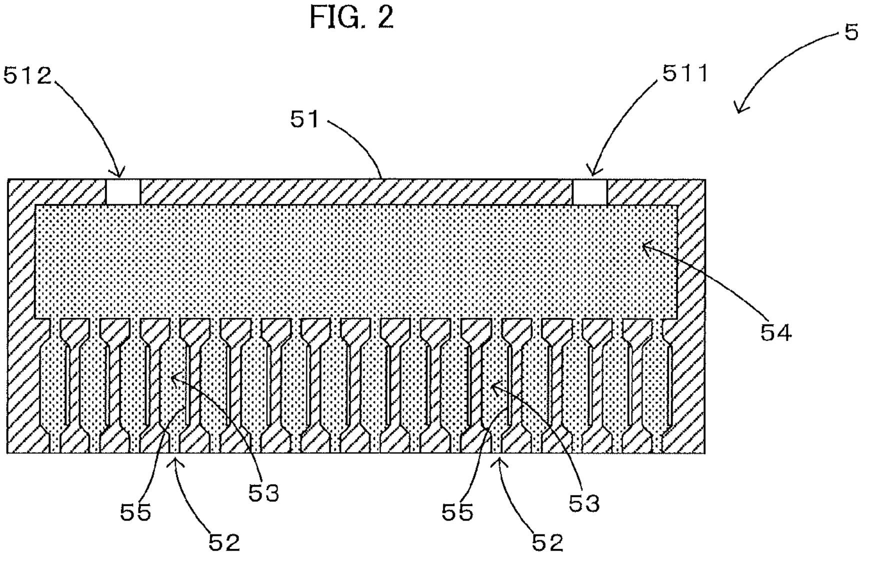
FIG. 2 is a partial cross-sectional view schematically showing the configuration of the ejection head.

FIG. 2 is a partial cross-sectional view schematically showing the configuration of the ejection head. As described above, printing unit 13 has a plurality of ejection heads 5, each of which ejects ink in an inkjet manner. As shown in FIG. 2, ejection head 5 has housing 51 and a plurality of nozzles 52 arranged in a predetermined direction at the bottom of housing 51, each of the plurality of nozzles 52 opening downward. Inside the housing 51, provided are a plurality of cavities 51 that communicate with a plurality of nozzles 52 respectively and an ink supply chamber 54 that communicates with the plurality of cavities 51. At the housing 51, an inlet 511 and an outlet 512 that are communicate with the ink supply chamber 54 open. The ink is supplied to ink supply chamber 54 in a cyclical manner by collecting the ink supplied to the ink supply chamber 54 from the inlet 511 from the outlet 512 by ink circulation mechanism not shown in the figures. The ink is supplied to each cavity 53 from such ink supply chamber 54.

For each of the multiple cavities 53, a piezoelectric element 55 is provided. The piezoelectric element 55 deforms in response to the applied electrical signal. The pressure of the ink in the cavity 53 fluctuates in response to the deformation of piezoelectric element 55. As described below, an ejection signal, which is an electrical signal, is applied to this piezoelectric element 55. When the ejection signal is applied to the piezoelectric element 55, the piezoelectric element 55 gives the ink in the cavity 53 the pressure fluctuation (ejection pressure fluctuation) required to eject ink from the nozzle 52.

Figure 3:
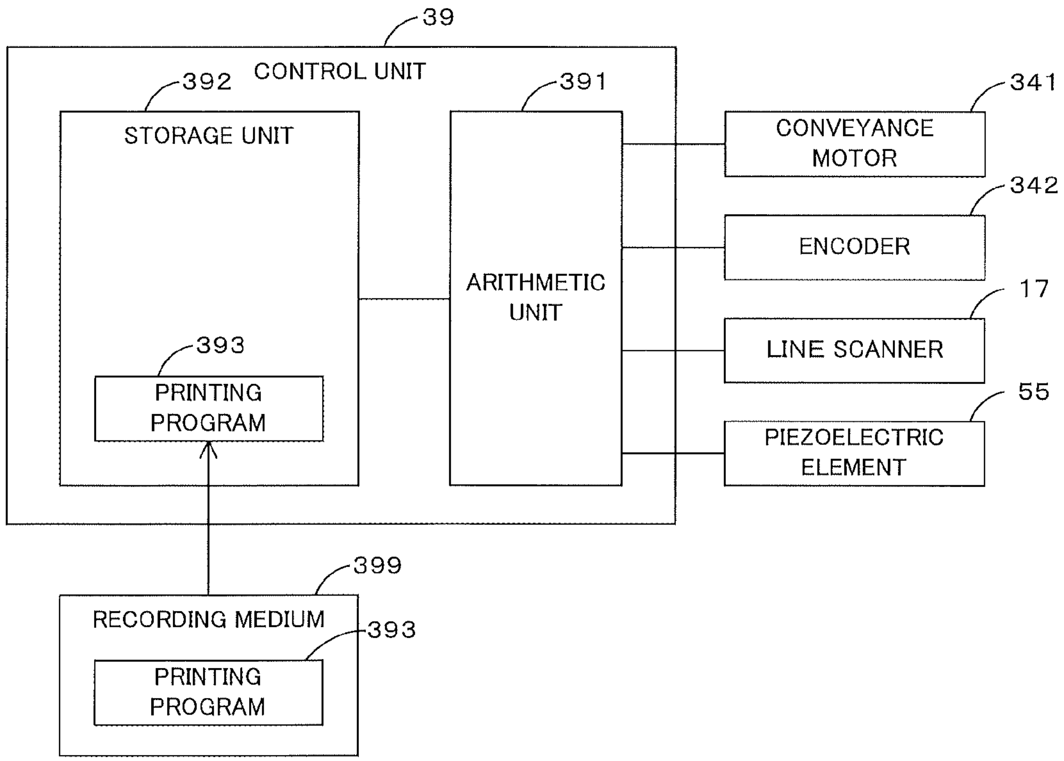
FIG. 3 is a block diagram showing the electrical configuration of the printing apparatus shown in FIG. 1.

FIG. 3 is a block diagram showing the electrical configuration of the printing apparatus shown in FIG. 1. As shown in FIG. 3, the printing apparatus 3 comprises a conveyance motor 341 that drives the driven roller 7 to convey the printing medium WP and an encoder 342 that detects the rotational position of the conveyance motor 341 (in other words, the conveyance position of the printing medium WP). The conveyance motor 341 is a servo motor that rotates driven roller 7. The printing apparatus 3 comprises a line scanner 17 (line camera). The line scanner 17 is positioned perpendicular to the conveyance direction X of the printing medium WP and captures images printed on the recording surface of the printing medium WP passing through the imaging position which is, for example, on downstream side of the printing unit 13 between the drying unit 15 and the discharge unit 4.

Furthermore, printing apparatus 3 comprises a control unit 39 that comprehensively controls the entire apparatus. This control unit 39 has an arithmetic unit 391 and a storage unit 392. For example, the arithmetic unit 391 is a processor such as a CPU (Central Processing Unit) or FPGA (Field-Programmable Gate Array), and the storage unit 392 is a storage device such as a HDD (Hard Disk Drive) or SSD (Solid State Drive). The arithmetic unit 391 controls the conveyance motor 341, encoder 342, line scanner 17, and piezoelectric element 55, and the storage unit 392 stores the printing program 393 executed by the arithmetic unit 391. This printing program 393 is provided, for example, by recording medium 399, which is provided separately from control unit 39. This recording medium 399 records the printing program 393 readable by a computer (control unit 39). Such recording media 399 is, for example, USB (Universal Serial Bus) memory, memory cards, or external server computer storage devices. The printing program 393 specifies the contents of the control performed by the control unit 39.

Figure 4:
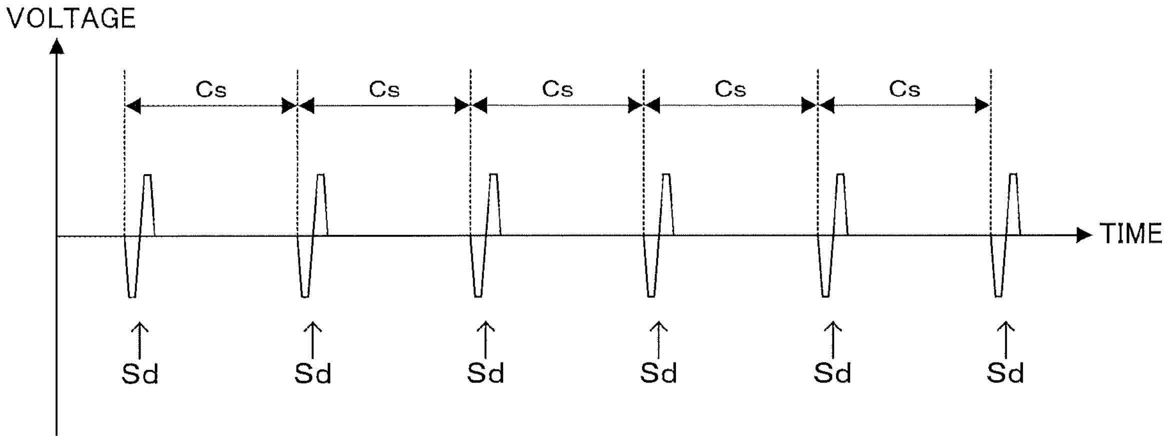
FIG. 4 schematically shows the waveform of the ejection signal output to the piezoelectric element of the ejection head.

FIG. 4 schematically shows the waveform of the ejection signal output to the piezoelectric element of the ejection head. In FIG. 4, the horizontal axis represents time and the vertical axis represents voltage. As shown in FIG. 4, ejection signal Sd is a voltage signal whose voltage varies over time. When arithmetic unit 391 outputs ejection signal Sd to piezoelectric element 55, piezoelectric element 55 fluctuates the pressure given to the ink in cavity 53 according to the change in voltage indicated by ejection signal Sd. This pressure fluctuation causes ink to be ejected from nozzle 52, which is connected to cavity 53. Such ejection signal Sd is output periodically according to the conveyance speed of the printing medium WP.

In detail, the arithmetic unit 391 calculates the speed at which the printing medium WP is conveyed based on the conveyance position of the printing medium WP detected by the encoder 342. The arithmetic unit 391 determines the period Cs (i.e., time interval) for outputting the ejection signal Sd to the piezoelectric element 55 based on the conveyance speed of the printing medium WP thus calculated. That is, to make ink land on the printing medium WP at a constant resolution regardless of the conveyance speed of the printing medium WP, it is necessary to adjust the period Cs for outputting ejection signal Sd according to the conveyance speed of the printing medium WP. Specifically, the arithmetic unit 391 shortens the period Cs of the ejection signal Sd as the conveyance speed of the printing medium WP increases and lengthens the period Cs of the ejection signal Sd as the conveyance speed of the printing medium WP decreases. In other words, period Cs is inversely proportional to the conveyance speed.

Figure 5:
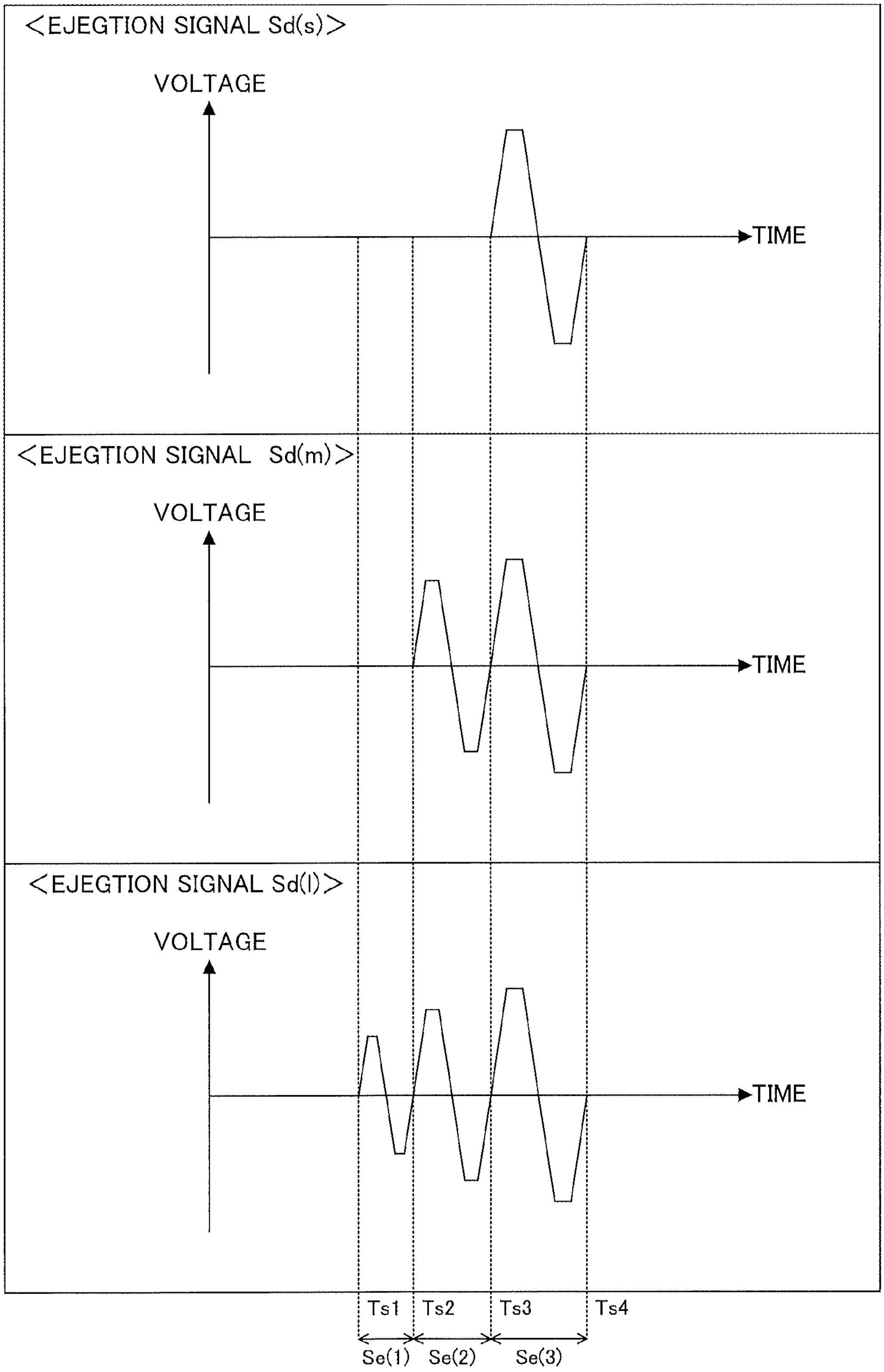
FIG. 5 schematically shows the details of the ejection signal.

FIG. 5 schematically shows the details of the ejection signal. In FIG. 5, the horizontal axis represents time, and the vertical axis represents voltage. The arithmetic unit 391 is configured to apply multiple element signals Se(1), Se(2), and Se(3) shown in FIG. 5 to piezoelectric element 55. Each of the element signals Se(1), Se(2), and Se(3) is a voltage signal whose voltage varies over time. The element signal Se (1) is applied between timeTs1 and timeTs2, the element signal Se (2) is applied between timeTs2 and timeTs3, and the element signal Se (3) is applied between timeTs3 and timeTs4. Here, timeTs1 corresponds to the start time of period Cs, and the time Ts1 to Ts4 are set so that the period from time Ts1 to time Ts4 is less than period Cs.

The arithmetic unit 391 generates multiple ejection signals Sd(s), Sd(m), and Sd(1) by changing the combination of element signals Se(1), Se(2), and Se(3) included in the ejection signal Sd. The ejection signal Sd(s) is an ejection signal Sd including one type of element signal Se(3), the ejection signal Sd(m) is an ejection signal Sd including consecutive two types of element signal Se(2) and Se(3), and the ejection signal Sd(1) is an ejection signal Sd including consecutive three types of element signal Se(1), Se(2) and Se(3). When the ejection signal Sd(s) is applied to the piezoelectric element 55, the piezoelectric element 55 causes the nozzle 52 to eject an S-size ink droplet. When the ejection signal Sd(m) is applied to the piezoelectric element 55, the piezoelectric element 55 causes the nozzle 52 to eject an M size ink droplet, which is larger than S size. When the ejection signal Sd(1) is applied to the piezoelectric element 55, the piezoelectric element 55 causes the nozzle 52 to eject an L-size ink droplet, which is larger than the M-size. That is, the arithmetic unit 391 can change the size (volume) of the ink droplet ejected from the nozzle 52 by switching the ejection signal Sd given to the piezoelectric element 55 among ejection signals Sd(s), S(m) and S(1).

Figure 6:
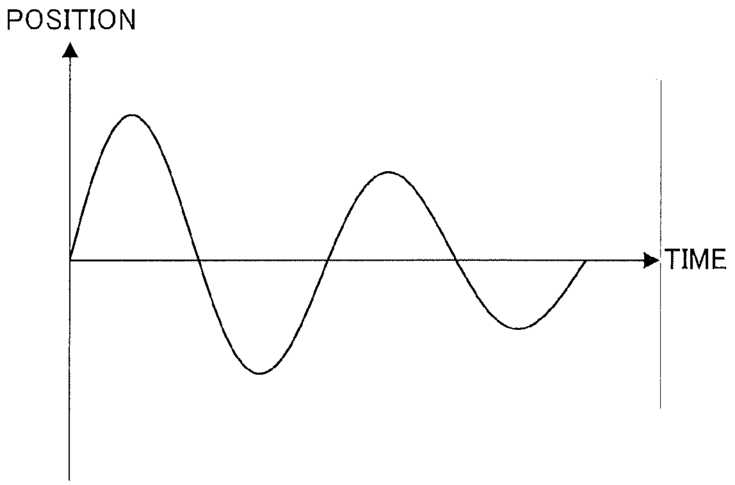
FIG. 6 schematically shows the residual vibration that occurs as the ink is ejected in response to the ejection signal.

By the way, in the ejection head 5 as described above, residual vibration occurs as the ink is ejected from the nozzle 52. This point is illustrated in FIG. 6. FIG. 6 schematically shows the residual vibration that occurs as the ink is ejected in response to the ejection signal. In FIG. 6, the horizontal axis represents time, and the vertical axis represents meniscus position. When the ink is ejected from the nozzle 52, the ink meniscus formed on the nozzle 52 vibrates. The residual vibrations of the meniscus generated by ink ejection decay over time. Therefore, if the period Cs of the ejection signal Sd is longer than the decay time of the residual vibration, there is no effect of the residual vibration of the meniscus on ink ejection in response to the ejection signal Sd. On the other hand, if the period Cs of the ejection signal Sd is shorter than the decay time of the residual vibration of the meniscus, ink is ejected in response to ejection signal Sd while the meniscus is vibrating. In such cases, when the residual vibration is in the opposite phase of the ejection signal Sd, the signal of the ejection signal Sd is attenuated and the ink ejection speed is significantly reduced, and the ink landing position on the printing medium WP may shift significantly. In particular, the effect of residual vibration depends on the size of the two ink droplets that are continuously ejected at period Cs.

FIG. 7 shows the relationship between the size of two consecutively ejected ink droplets and the effect of residual vibration in table form. In this figure, the preceding ink droplet is the first one of two consecutive ink droplets ejected from the same nozzle 52, the subsequent ink droplet is the one that is ejected after the preceding ink droplet. The effect of the residual vibration that is focused on here means the effect of the residual vibration caused by the ejection of the preceding ink droplet on the ejection of the subsequent ink droplet.

The overall trend is, the larger the size of the preceding ink droplet, the greater the effect of the residual vibration on the subsequent ink droplet's ejection, the larger the size of the subsequent ink droplet, the greater the effect of residual vibration on the subsequent ink droplet's ejection. Factors contributing to the latter tendency could be as follows. That is, as shown in FIG. 5, the larger the size of the ink droplet, the earlier the ejection signal Sd starts. Therefore, the ejection signal Sd for the subsequent ink droplet is applied before the residual vibration caused by the ejection of the preceding ink droplet has sufficiently decayed, and the effect of the residual vibration becomes larger.

Therefore, as shown in FIG. 7, when the size of the preceding ink droplet is size S, the effect of the residual vibration is small regardless of whether the size of the subsequent ink droplet is size S, M or L. When the size of the preceding ink droplet is size M and the size of the subsequent ink droplet is size S, the effect of the residual vibration is small. When the preceding ink droplet is size M and the subsequent ink droplet is size M or L, the effect of the residual vibration is moderate. When the size of the preceding ink droplet is size L and the size of the subsequent ink droplet is size S, the effect of the residual vibration is moderate. When the preceding ink droplet is size L and the subsequent ink droplet is size M or L, the effect of the residual vibration is significant.

Figure 8:
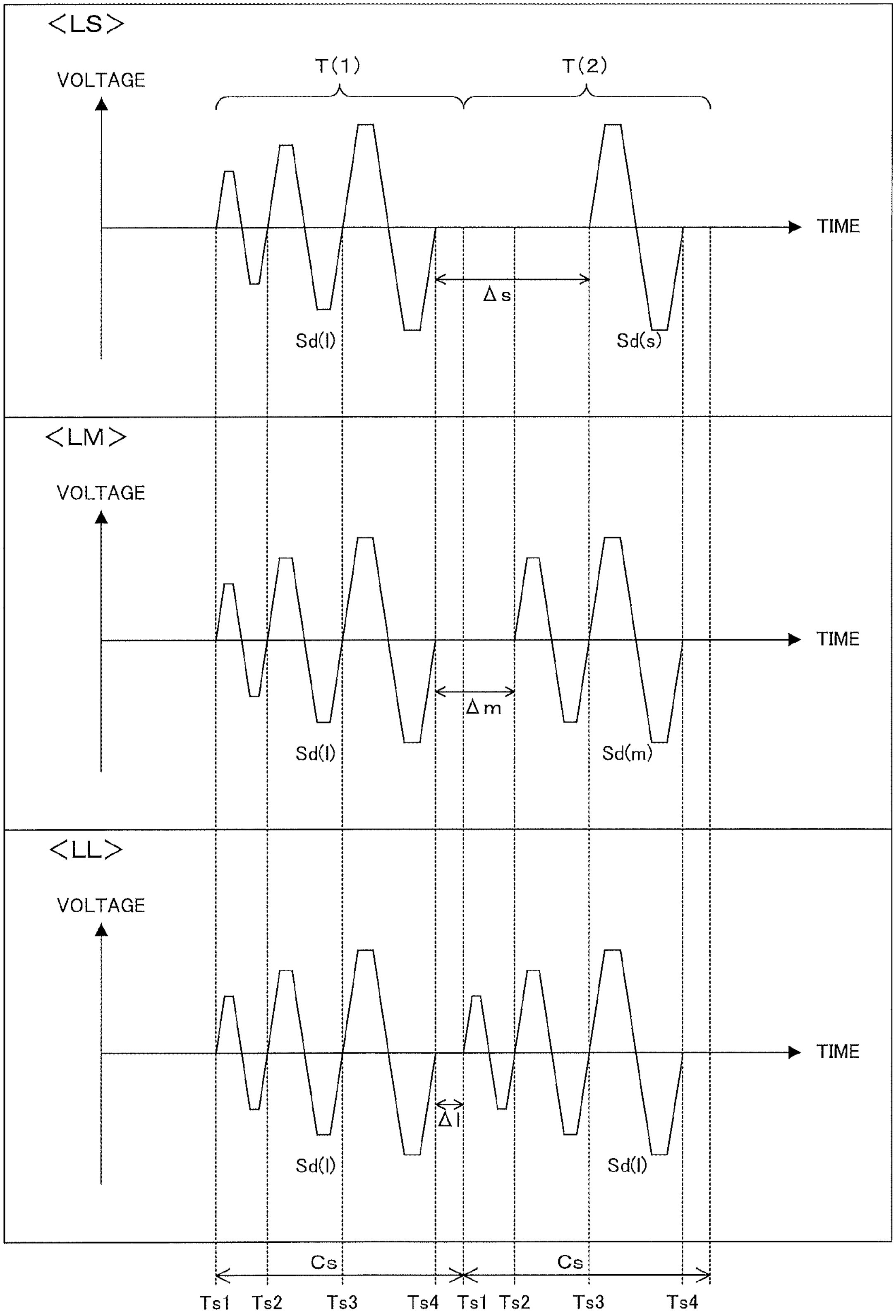
FIG. 8 schematically shows the relationship between each ejection signal when the size of the preceding ink droplet among two consecutively ejected ink droplets is L size.

FIG. 8 schematically shows the relationship between each ejection signal when the size of the preceding ink droplet among two consecutively ejected ink droplets is L size. In FIG. 8, the horizontal axis represents time, and the vertical axis represents voltage. In this figure, the "LS" column indicates the case where an S-size ink droplet is ejected after an L-size ink droplet is ejected, the "LM" column indicates the case where an M-size ink droplet is ejected after an L-size ink droplet is ejected, and the "LL" column indicates the case where an L-size ink droplet is ejected after an L-size ink droplet is dispensed.

In these examples, the ejection signal Sd is applied in each of the consecutive timing T(1) and T(2) (in other words, periods T(1) and T(2) with period Cs). In the example shown in the "LS" column, the ejection signal Sd(1) is applied at the timing T1 and the ejection signal Sd(s) is applied at the timing T2 after the timing T1. In this case, the ejection signal Sd (s) rises at the time Ts3, so there is a time interval Δs between the preceding ejection signal Sd (l) and the rise of the subsequent ejection signal Sd (s). In the example shown in the "LM" column, the ejection signal Sd(l) is applied at the timing T1 and ejection signal Sd(m) is applied at the timing T2 after the timing T1. In this case, the ejection signal Sd (m) rises at the time Ts2, so there is a time interval Δm from the preceding ejection signal Sd (l) to the rise of the subsequent ejection signal Sd (m). In the example shown in the "LL" column, the ejection signal Sd(1) is applied at the timing T1 and ejection signal Sd(L) is applied at the timingT2 after the timingT1. In this case, the ejection signal Sd(l) rises at the timeTs1, so there is a time interval Δl from the preceding ejection signal Sd(l) to the rise of the subsequent ejection signal Sd(l).

Thus, when two ejection signals Sd are applied at period Cs, the larger the size of the ink droplet ejected by the subsequent ejection signal Sd, the shorter the time interval Δs, Δm, and Δl between the two ejection signals Sd. As the result, the trends described using FIG. 7 shows.

Figure 9:
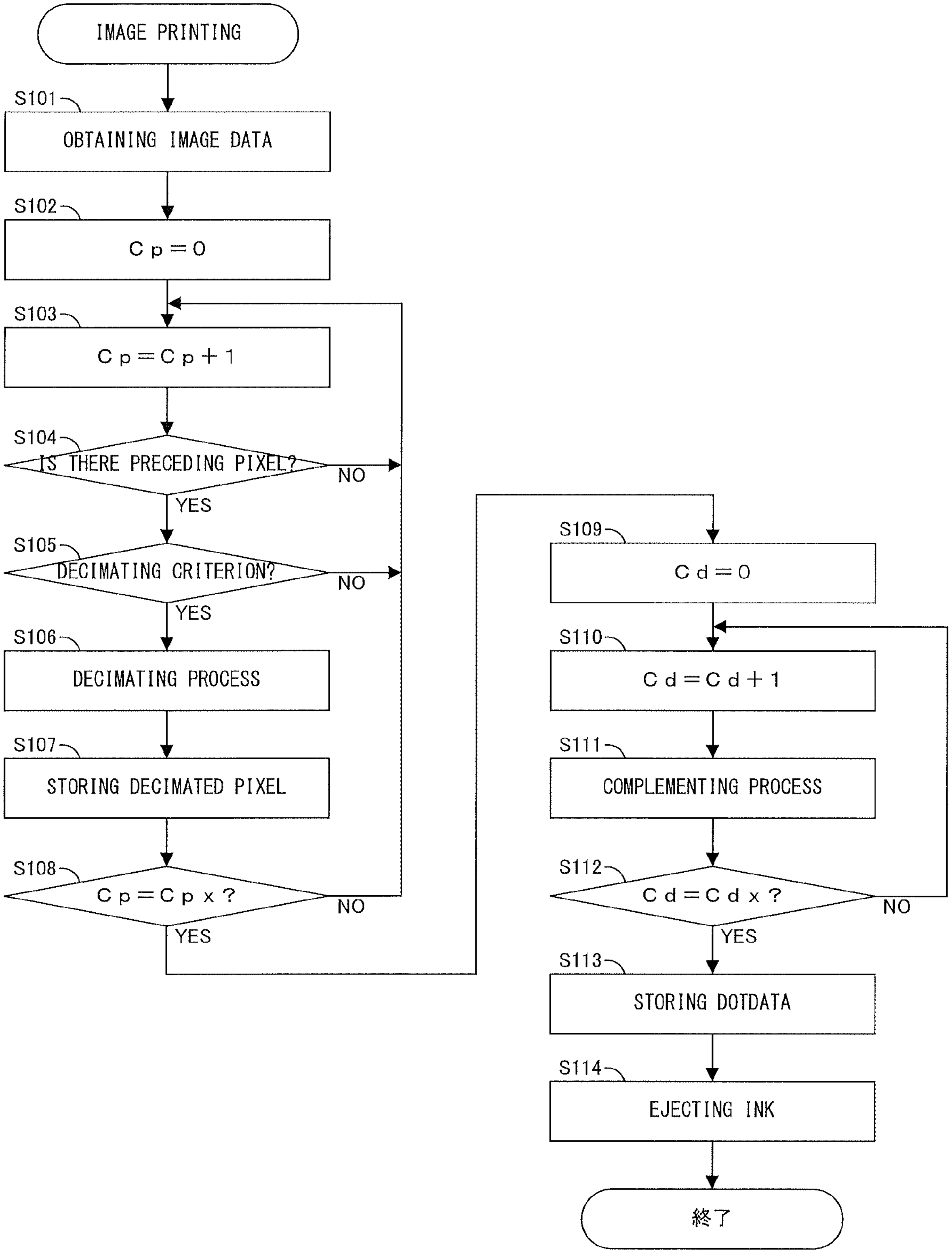
FIG. 9 is a flowchart showing an example of image printing executed by the printing apparatus, FIG. 10A schematically illustrate an example of image processing performed according to the flowchart of FIG. 9.
Figure 10A:
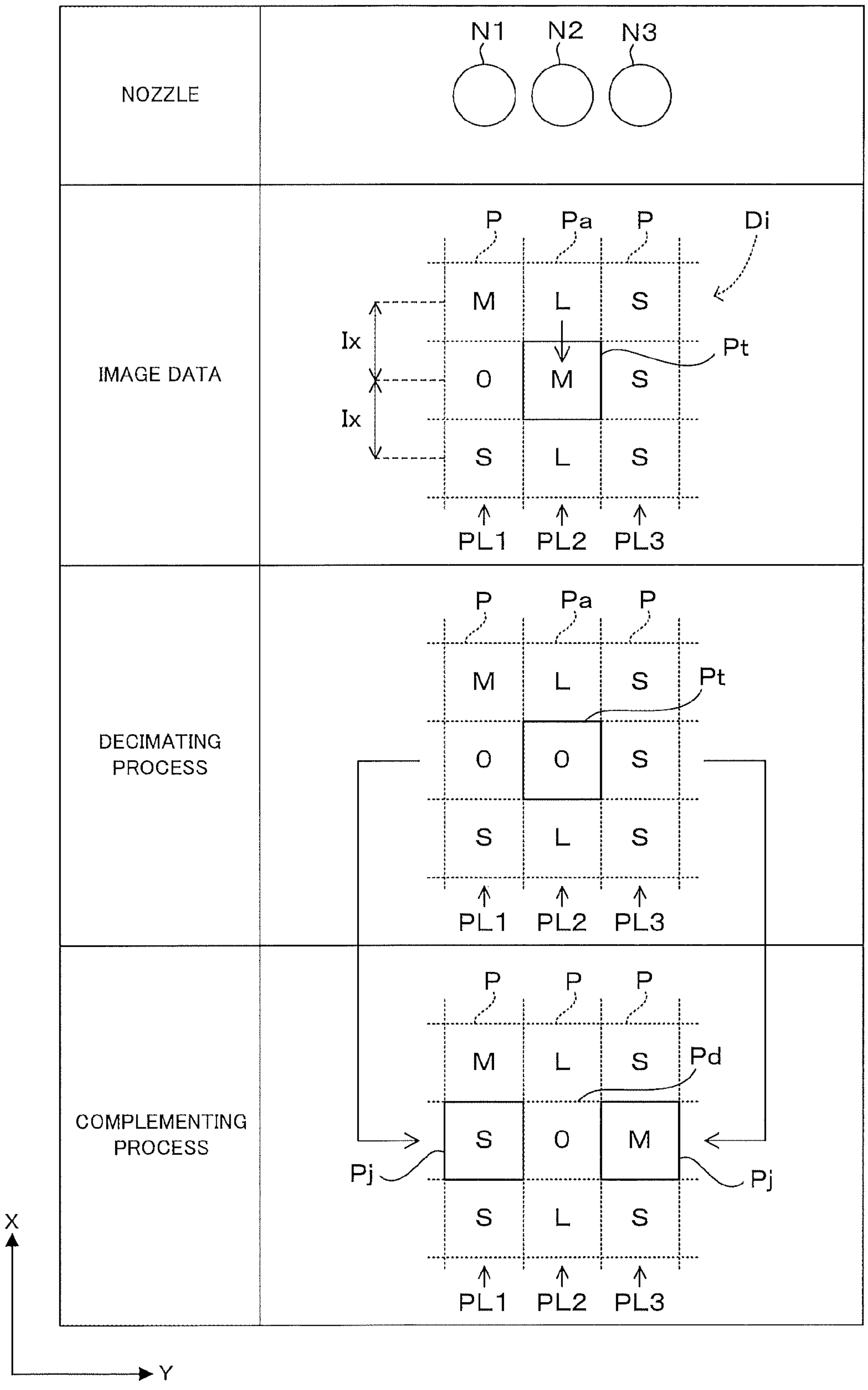
FIG. 10B schematically illustrate an example of image processing performed according to the flowchart of FIG. 9.
FIG. 10C schematically illustrate an example of image processing performed according to the flowchart of FIG. 9.
Figure 10B:
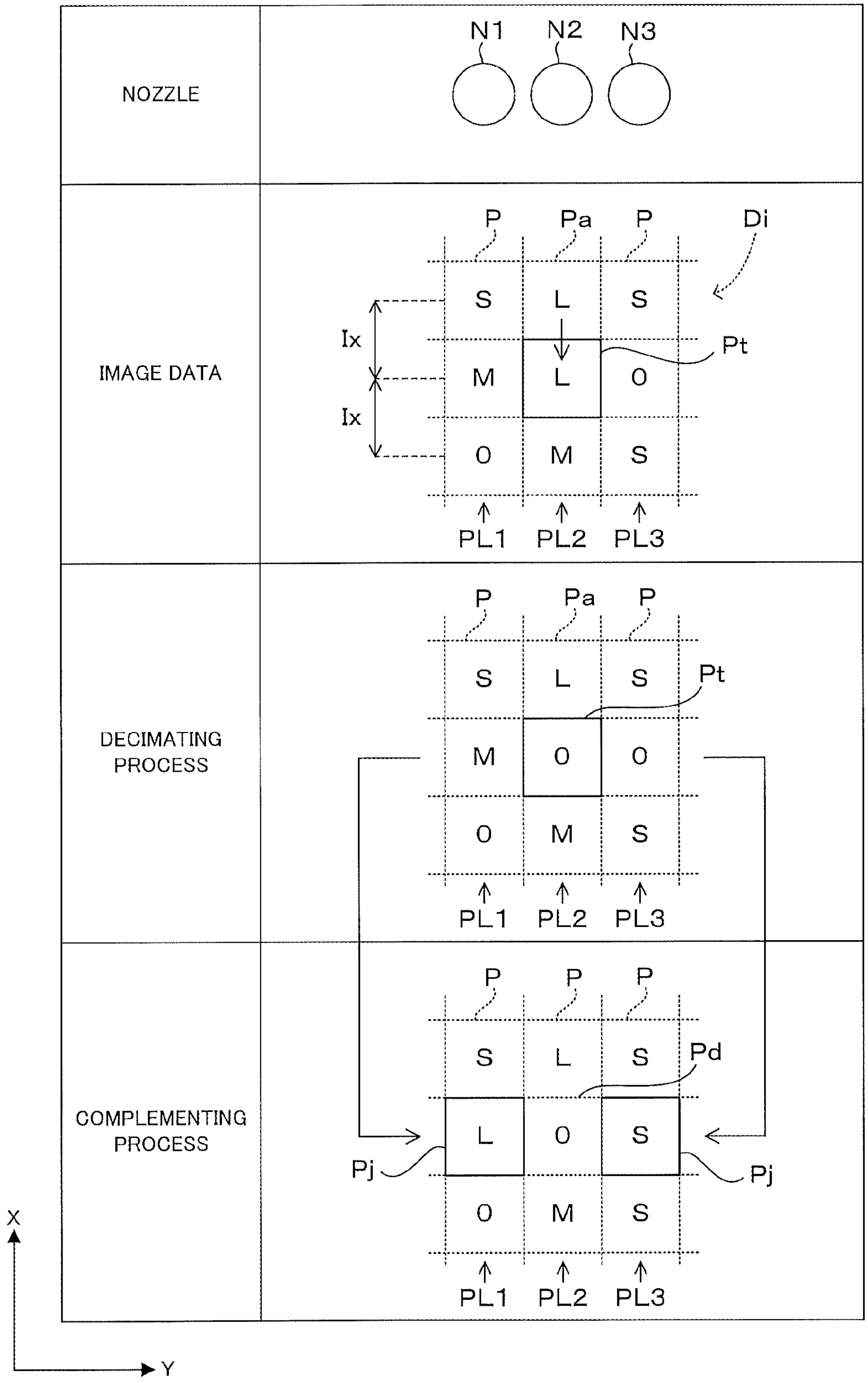
Figure 10C:
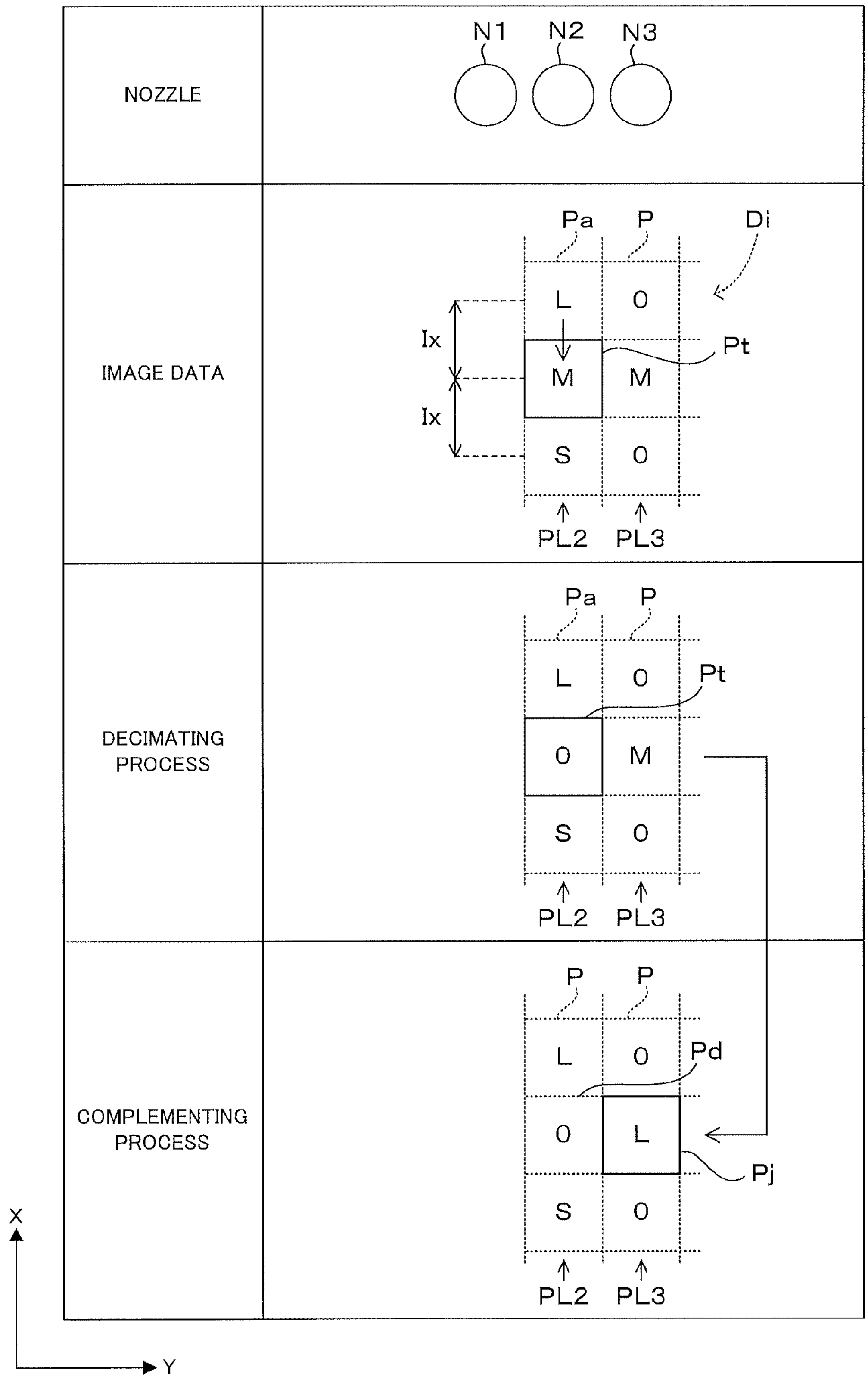

FIG. 9 is a flowchart showing an example of image printing executed by the printing apparatus, FIGS. 10A, 10B, and 10C schematically illustrate an example of image processing performed according to the flowchart of FIG. 9. The flowchart in FIG. 9 is executed by the arithmetic unit 391 based on the printing program 393 in order to print good images while suppressing the effects of the residual vibration described above.

In FIGS. 10A through 10C, the reference signs N1, N2, N3, . . . are used for the nozzle 52 instead of reference sign 52. These nozzles N1, N2, N3, . . . are located at different positions from each other in the Y direction and eject ink droplets based on image data Di. The image data Di includes a plurality of pixels P arranged two-dimensionally in the X and Y directions. By ejecting the ink droplets from the nozzles N1, N2, N3, . . . to the pixels P set virtually for the printing medium WP, the image shown by the image data Di is printed on the printing medium WP. The pitch Ix at which pixel P is arranged in the X direction corresponds to the resolution of image data Di, which is equal to the conveyance speed of printing medium WP multiplied by the period Cs of ejection signal Sd.

A plurality of nozzles N1, N2, N3, . . . face a plurality of pixel rows PL1, PL2, PL3, . . . that are adjacent in the Y direction. Each of pixel rows PL1, PL2, PL3, . . . is formed by a plurality of pixel P arranged in one row in the X direction. The nozzles N1, N2, N3, . . . eject the ink droplets synchronously with the conveyance of the printing medium WP in the X direction. Thereby, nozzles N1, N2, N3, . . . eject the ink droplets to multiple pixel P in the opposing pixel rows PL1, PL2, PL3, . . . in order from downstream in the X direction (conveyance direction). In particular, the image data Di indicates the size (S, M, L) of the ink droplet to be ejected to the pixel P for each pixel P, and the nozzles N1, N2, N3, . . . eject the ink droplet having the indicated size to the pixel P.

The flowchart in FIG. 9 corrects the image data Di by adjusting the size of the ink droplet set for each pixel P in the image data Di so that the effect of the above residual vibration is suppressed. Specifically, a decimating process is performed to reduce the size of subsequent ink droplets included in the combination of ink droplets shown in FIG. 7, which have a significant effect from the residual vibration, to zero. Each of the above ink droplet size combinations, which have a significant effect from the residual vibration, will be referred to hereafter as the "decimating criterion" as appropriate. This decimating criterion is stored in advance in storage unit 392.

When the flowchart in FIG. 9 starts, the arithmetic unit 391 obtains the image data Di (step S101). In this case, the arithmetic unit 391 may obtain the image data Di by receiving the image data Di generated by an external computer or by generating the image data Di based on print data received from an external computer. In step S102, the arithmetic unit 391 sets the count value Cp of the pixel P (i.e., the value for identifying the pixel P) to zero, and in step S103, increments the count value Cp of the pixel P by "1".

In step S104, the arithmetic unit 391 checks whether or not there is a preceding pixel P to which the ink droplet is ejected prior to the pixel P (target pixel) of count value Cp. Specifically, the existence of the pixel P (the preceding pixel) adjacent to a target pixel P of count value Cp on the downstream side (arrow side) in the X direction is confirmed. For example, if the target pixel P is located at the edge of the image and there is no corresponding preceding pixel P ("NO" in step S104), return to step S103 and increment the count value Cp of the pixel P by 1.

If the corresponding preceding pixel P exists (if "YES" in step S104), the arithmetic unit 391 determines whether or not the preceding pixel P and the target pixel P satisfy the decimating criterion. That is, whether or not one of the following two decimating criterion is satisfied is determined.

- the size of the preceding ink droplet is size L and the size of the subsequent ink droplet is size M.
- the size of the preceding link droplet is L and the size of the subsequent ink droplet is L.

If none of these decimating criteria is satisfied ("NO" in step S105), return to step S103 without changing the size of the ink droplet to be ejected to the target pixel P.

On the other hand, if any of these decimating criteria is satisfied (if "YES" in step S105), then proceed to step S106. Here, specific examples where the decimating criterion is satisfied are explained based on the "Image Data" columns in FIGS. 10A through 10C, respectively.

If the pixel P surrounded by a solid rectangle in the "Image Data" column in FIG. 10A is the target pixel Pt, the pixel P adjacent to the target pixel Pt on the downstream side in the X direction is the preceding pixel Pa. In this example, the decimating criterion is satisfied because the size of the ink droplet to be ejected to the preceding pixel Pa is size L and the size of the ink droplet to be ejected to the target pixel Pt is size M.

If the pixel P surrounded by a solid rectangle in the "Image Data" column in FIG. 10B is the target pixel Pt, the pixel P adjacent to the target pixel Pt on the downstream side in the X direction is the preceding pixel Pa. In this example, the decimating criterion is satisfied because the size of the ink droplet to be ejected to the preceding pixel Pa is size L and the size of the ink droplet to be ejected to the target pixel Pt is size L.

If the pixel P surrounded by a solid rectangle in the "Image Data" column in FIG. 10C is the target pixel Pt, the pixel P adjacent to the target pixel Pt on the downstream side in the X direction is the preceding pixel Pa. In this example, the decimating criterion is satisfied because the size of the ink droplet to be ejected to the preceding pixel Pa is size L and the size of the ink droplet to be ejected to the target pixel Pt is size M.

In the decimating process of step S106, the size of the ink droplet of the target pixel Pt is set to zero. Here, setting the size of the ink droplet to zero corresponds to not ejecting the ink droplet from the nozzle that was supposed to eject the ink droplet. The following is a specific explanation of this decimating process based on FIGS. 10A through 10C. In the example of "decimating process" in FIG. 10A, the size of the ink droplet to be ejected to the target pixel Pt is changed from M size to zero. In the "decimating process" example in FIG. 10B, the size of the ink droplet to be ejected to the target pixel Pt is changed from size L to zero. In the "decimating process" example in FIG. 10C, the size of the ink droplet to be ejected to the target pixel Pt is changed from size M to zero.

In step S107, the arithmetic unit 391 stores the pixel Pt to which the decimating process has been executed as a decimated pixel Pd in storage unit 392 for later complementing process. Steps S103 to S107 are repeatedly executed until the count value Cp of pixel P becomes the maximum value Cpx (the total number of pixel P constituting the image data Di) (until "YES" in step S108).

When the count value Cp of the pixel P becomes the maximum value Cpx ("YES" in step S108), the count value Cd (i.e., the value for identifying the decimated pixel Pd) is set to zero (step S109), and the count value Cd of the decimated pixel Pd is incremented by "1" (Step S110).

In step S111, a complementing process is performed to complement the lack of ink volume due to setting zero to the size of the ink droplet to the decimated pixel Pd. In this complementing process, the size of the ink droplet to be ejected to an adjacent pixel Pi is increased, the adjacent pixel Pi being adjacent to the decimated pixel Pd of count value Cd in the Y direction. For example, if the size of the ink droplet to be ejected to the adjacent pixel Pj is size S, it is increased to size M, and if this size is size M, it is increased to size L. If this size is size L, the size is not increased because no larger size exists. This complementing process is specifically illustrated using FIGS. 10A through 10C.

In the "complementing process" example in FIG. 10A, the size of the ink droplet to be ejected to the adjacent pixel Pj adjacent to the decimated pixel Pd on one side of the Y direction (right side) is increased from S size to M size, the size of the ink droplet to be ejected to the adjacent pixel Pj adjacent to the decimated pixel Pd on the other side (left side) of the Y direction is increased from zero to S size.

In the "complementing process" example in FIG. 10B, the size of the ink droplet to be ejected to the adjacent pixel Pj adjacent to the decimated pixel Pd on one side of the Y direction (right side) is increased from zero to S size, the size of the ink droplet to be dispensed on the adjacent pixel Pj adjacent to the decimated pixel Pd on the other side (left side) of the Y direction is increased from size M to size L.

In the "complementing process" example in FIG. 10C, the size of the ink droplet to be ejected to the adjacent pixel Pj adjacent to the decimated pixel Pd on one side (right side) of the Y direction is increased from M size to L size. Since the decimated pixel Pd is located at the other end of the Y direction, there is no adjacent pixel Pj adjacent to the decimated pixel Pd on the other side (left side) of the Y direction.

Steps S110-S111 are repeatedly executed until the count value Cd of the decimated pixel Pd becomes the maximum value Cdx (the total number of decimated pixel Pd stored in step S107) (until "YES" in step S112).

When the count value Cd of the decimated pixel Pd becomes the maximum value Cdx ("YES" in step S112), the arithmetic unit 391 stores the image data Di for which the decimating and complementing processes have been executed in the storage unit 392 as dot data Dd (step S113). In step S114, the arithmetic unit 391 makes the nozzles N1, N2, N3, . . . eject the ink droplets of the size indicated by the dot data Dd to print the image indicated by the image data Di on the printing medium WP.

In the embodiment described above, the size of the ink droplet to be ejected to each pixel P defined by the image data Di (ejection data) is corrected. Specifically, the size (quantity) of the ink droplet that the nozzle 52 ejects to the target pixel Pt is corrected based on a comparison between the size of the ink droplet that is to be ejected from the nozzle 52 to the preceding pixel Pa (first ejection condition) at timing T1 (first timing) and the size of the ink droplet that is to be ejected from the nozzle 52 to the target pixel Pt at timingT2 (second timing) (second ejection condition) (Steps S105 and S106). Thus, based on the size of the ink droplet to the preceding pixel Pa and target pixel Pt indicated by the image data Di, it is possible to respond to the situation where the effect of residual vibration is judged to be significant. As a result, the effect of residual vibration of ink due to ink droplet ejection from the nozzle 52 can be suppressed and good printing can be achieved.

The control unit 39 stores a decimating criterion (reducing criterion) in storage unit 392, decimating criterion being for reducing the size of the ink droplet to be ejected from nozzle 52 to the target pixel Pt at timing T2 from the size indicated by the image data Di. If the combination of the sizes of the ink droplets to the preceding pixel Pa and target pixel Pt indicated by image data Di (in other words, the comparison result) satisfies the decimating criterion (if "YES" in step S105), it is determined in step S106 that the size of the ink droplet to be ejected by the nozzle 52 at timingT2 is reduced (decimating process). In such a configuration, the situation where the effect of the residual vibration is judged to be significant based on the size of the ink droplet to the preceding pixel Pa and the target pixel Pt indicated by the image data Di can be handled by reducing the size of the ink droplet ejected by the nozzle 52 at timing T2. As a result, the effect of the residual vibration of ink due to the ink droplet ejection from the nozzle 52 can be suppressed and good printing can be achieved.

If the combination of the size of the ink droplet to the preceding pixel Pa and the target pixel Pt indicated by the image data Di satisfies the decimating criterion (if "YES" in step S105), control unit 39 determined that the size of the ink droplet ejected from the nozzle 52 at timingT2 is set to be zero (decimating process). In such a configuration, the situation where the effect of the residual vibration is judged to be significant based on the size of the ink droplet to the preceding pixel Pa and the target pixel Pt indicated by the image data Di can be handled by setting the size of the ink droplet that nozzle 52 ejected at timing T2 to zero. As a result, the effect of the residual vibration of ink due to the ink droplet ejection from the nozzle 52 can be suppressed and good printing can be achieved.

In ejection head 5, a plurality of nozzles N1, N2, N3, . . . are provided, and the plurality of nozzles N1, N2, N3, . . . eject ink droplets at different positions from each other in the Y direction. On the other hand, if it is determined to reduce the size of the ink droplet that nozzle N2 ejects at timing T2 in the decimating process, the control unit 39 increases the size of the ink droplet to be ejected from nozzles N1 and N3 (adjacent nozzles) to adjacent pixels Pj rather than the size indicated by the image data Di (complementing process), the nozzles N1 and N3 facing the adjacent pixels Pj adjacent to the target pixel Pt in the Y direction. That is, the amount of the ink droplet that adheres to the area including the target pixel Pt may be insufficient because the size of the ink droplet that the nozzle N2 ejects at timingT2 has been reduced in order to suppress the effect of the residual vibration. In contrast, by increasing the size of the ink droplet ejected from the nozzles N1 and N3 to adjacent pixel Pj of target pixel Pt, it is possible to complete the insufficient amount of the ink droplet and print a good image.

The first variation of image printing is then described using FIGS. 11A and 11B. Here, FIGS. 11A and 11B show the relationship between the size of two consecutively ejected ink droplets and the effect of the residual vibration in table form, especially the relationship between the period Cs during which the ejection signals Sd are output and the effect of the residual vibration. That is, as can be seen from the above explanation using FIG. 8, the shorter the period Cs of ejection signal Sd, the shorter the time interval between ejection signal Sd ejected at timingT1 and ejection signal Sd ejected at timing T2, and the greater the effect of residual vibration.

Therefore, the effect of the residual vibration when the period Cs is less than a predetermined period (FIG. 11A) is more significant than the effect of the residual vibration when the period Cs is longer than or equal to the predetermined period (FIG. 11B). As a result, the effect of the residual vibration shown in FIG. 11A is the same as that in FIG. 7, while in FIG. 11B, there is no combination of ink droplet sizes that causes a significant effect of the residual vibration, or in other words, no combination of ink droplet sizes that requires a decimating process.

Therefore, in the first variation of image printing, before step S105 of the flowchart in FIG. 9, it is determined whether or not the period Cs of the ejection signal Sd is less than the threshold period corresponding to a predetermined period. If period Cs is longer than or equal to the threshold period, proceed to step S108 without performing steps S105-S107. On the other hand, if period Cs is less than the threshold period, steps S105 to S107 are executed.

In this first variation, one threshold period is provided for period Cs of ejection signal Sd. However, in regions where period Cs is even shorter, it is assumed that the number of combinations of the size of the ink droplet, where the effect of the residual vibration is more significant, may increase. In such a case, a threshold period may be set for the boundary where the number of relevant combinations changes as period Cs changes. The decimating criterion (i.e., the combination of the size of the ink droplet that has a significant effect from the residual vibration) may be changed according to a comparison between period Cs and the threshold period.

Thus, in the first variation, control unit 39 determines the size of the ink droplet to be ejected by nozzle 52 at timing T2 based on the combination of the size of the ink droplet to the preceding pixel Pa and target pixel Pt indicated by image data Di and the period Cs of the ejection signal Sd (in other words, based on the time interval between timing T1 and timing T2) (steps S105 to S107). In such a configuration, it is possible to accurately respond to the effects of the residual vibration, which varies with the period Cs of the ejection signal Sd, and to perform good printing.

Next, the second variation of image printing is explained using FIGS. 12A and 12B. Here, FIGS. 12A and 12B show the relationship between the size of two consecutively ejected ink droplets and the effect of the residual vibration in table form, especially the relationship between ink temperature and the effect of residual vibration. In other words, the lower the temperature of the ink in the ejection head 5, the higher the viscosity of the ink, which tends to reduce the effect of the residual vibration.

Therefore, the effect of the residual vibration when the ink temperature is higher than or equal to the predetermined temperature (FIG. 12A) is more significant than the effect of residual vibration when the ink temperature is less than the predetermined temperature (FIG. 12B). As a result, the effect of the residual vibration shown in FIG. 12A is the same as that in FIG. 7, while in FIG. 12B, there is no combination of ink droplet sizes that causes a significant effect of the residual vibration, in other words, no combination of ink droplet sizes that requires a decimating process.

Therefore, in the second variation of image printing, before step S105 of the flowchart in FIG. 9, it is determined whether the temperature of the ink is higher than or equal to the threshold temperature, which corresponds to the predetermined temperature. Note that, the arithmetic unit 391 can check the temperature of the ink, for example, by obtaining the detection value of a thermometer installed in the ink supply chamber 54 of the ejection head 5. If the ink temperature is less than the threshold temperature, proceeds to step S108 without performing steps S105 to S107. On the other hand, if the ink temperature is higher than or equal to the threshold temperature, steps S105 to S107 are executed.

In this second variation, one threshold temperature is provided for the temperature of the ink. However, in regions where the ink temperature is even higher, it is assumed that the number of combinations of the size of the ink droplet, where the effect of residual vibration is more significant, may increase. In such cases, a threshold temperature may be set for the boundary where the number of relevant combinations changes in response to changes in ink temperature. The decimating criterion (i.e., the combination of the size of the ink droplet that has a significant effect from the residual vibration) may be changed according to a comparison of the period Cs and the threshold temperature.

Thus, in the second variation, control unit 39 determines the size of the ink droplet that nozzle 52 ejects at timing T2 based on the combination of the size of the ink droplet to the preceding pixel Pa and the target pixel Pt indicated by image data Di and the temperature of the ink (steps S105 to S107). In such a configuration, it is possible to accurately respond to the effects of the residual vibrations, which vary with the temperature of the ink, to achieve good printing.

In the embodiments described above, the printing apparatus 3 corresponds to an example of "printing apparatus" of the present invention, the control unit 39 corresponds to an example of "control unit" or "computer" of the present invention, the printing program 393 corresponds to an example of "printing program" of the present invention, a recording medium 399 corresponds to an example of "recording medium" of the present invention, an ejection head 5 corresponds to an example of "ejection head" of the present invention, the nozzle 52, N1, N2, N3, . . . correspond to an example of "nozzle" of the present invention, the nozzles N1 and N3 correspond to an example of "adjacent nozzle" of the present invention, the image data Di corresponds to an example of "ejection data" of the present invention, the pixel P corresponds to an example of a pixel of the present invention, the target pixel Pt corresponds to an example of "target pixel" of the present invention, the adjacent pixel Pj corresponds to an example of "adjacent pixel" of the present invention, the timing T1 corresponds to an example of "first timing" of the present invention, the timing T2 corresponds to an example of "second timing" of the present invention, steps S105 to S106 correspond to an example of "decision process" of the present invention, the size (amount) of ink droplet corresponds to an example of "ejection condition" of the present invention, the size of ink droplet ejected at timing T1 corresponds to an example of "first ejection condition" of the present invention, the size of ink droplet ejected at timing T2 corresponds to an example of "ejection condition" of the present invention, the size of the link droplet ejected at timing T2 corresponds to an example of "second ejection condition" of the present invention, the decimating criterion corresponds to an example of "reducing criterion" of the present invention, the period Cs corresponds to an example of "time corresponding to the resolution" of the present invention.

Further, the present invention is not limited to the above-described embodiment, but numerous modifications and variations other than those described above can be devised without departing from the scope of the invention. For example, a third variation may be performed by combining the first and second variations of image printing.

In the third variation of image printing, if the period Cs of ejection signal Sd is longer than or equal to the threshold period but the ink temperature is higher than or equal to the threshold temperature, steps S105 to S107 are performed using the combination of ink droplet sizes that has a significant effect from the residual vibration in FIG. 7 as the decimating criterion. If the ink temperature is less than the threshold temperature but the period Cs of ejection signal Sd is less than the threshold period, steps S105 to S107 are performed using the combination of the sizes of the ink droplets that has a significant effect from the residual vibration in FIG. 7 as the decimating criterion. Furthermore, if the ink temperature higher than or equal to the threshold temperature and the period Cs of ejection signal Sd is less than the threshold period, steps S105 to S107 are performed using the combination of the sizes of the ink droplets that has a significant effect from the residual vibration in FIG. 7 as the decimating criterion. Conversely, if the ink temperature is less than the threshold temperature and the period Cs of the ejection signal Sd is longer than or equal to the threshold period, proceed to step S108 without performing steps S105 to S107.

The way to combine the first and second variations of image printing is not limited to this example but can also be combined as in the following fourth variation. In this fourth variation, a table quantifying the effect of the residual vibration (small, moderate, and significant) shown in FIGS. 11A, 11B, 12A, and 12B is prepared as a decimating criterion. This table is prepared for each of FIGS. 11A, 11B, 12A and 12B. The combination of the size of the ink droplet and the numerical value corresponding to the period Cs of the ejection signal Sd (period reference numerical value) is obtained based on a table (the table corresponding to FIG. 11A or FIG. 11B). Similarly, the combination of the size of the ink droplet and the numerical value corresponding to the temperature of the ink (temperature reference numerical values) are obtained based on a table (the table corresponding to FIG. 12A or FIG. 12B). If the product (or sum) of the period reference numerical value and the temperature reference numerical value is less than the predetermined threshold value, proceed to step S108 without performing steps S105 to S107, If the product (or sum) of the period reference numerical value and the temperature reference numerical value is larger than or equal to the predetermined threshold value, perform steps S105 to S107.

Figure 13:
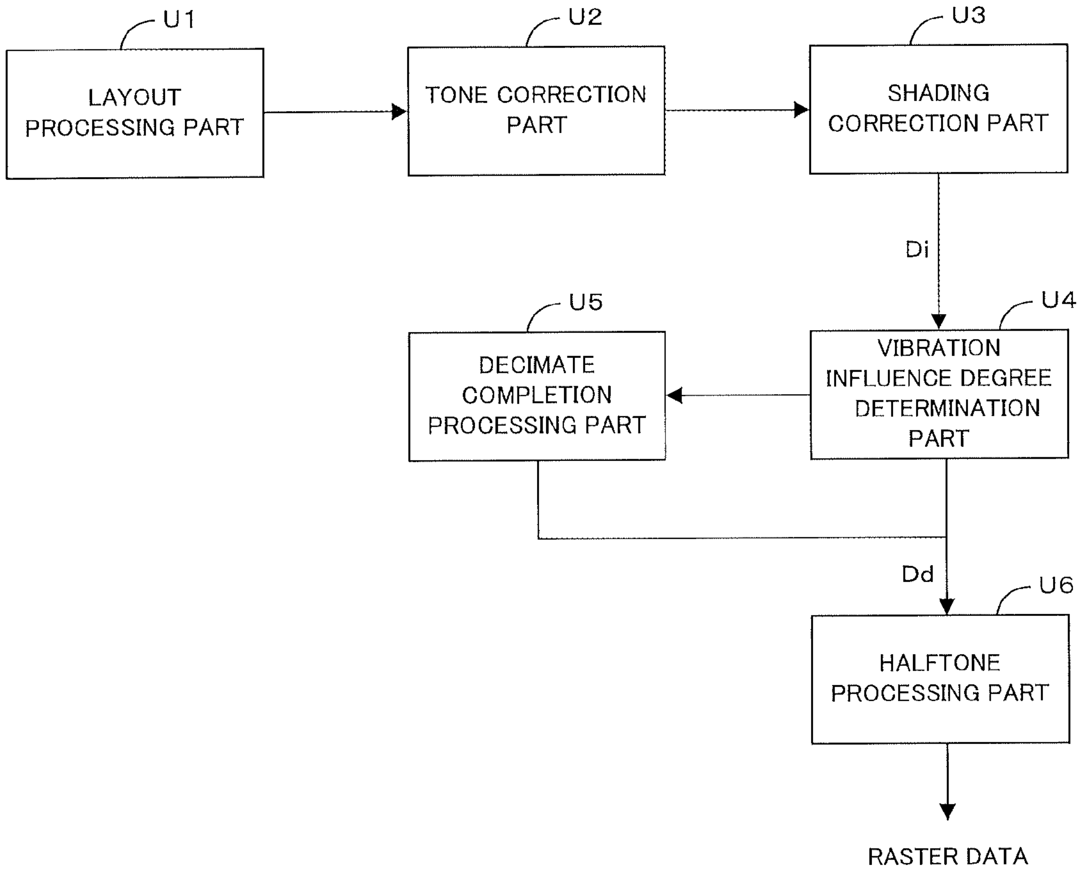
FIG. 13 is a block diagram showing the electrical configuration for executing image printing.

Alternatively, the configuration shown in FIG. 13 may be built in arithmetic unit 391 to perform the image printing in FIG. 9. FIG. 13 is a block diagram showing the electrical configuration for executing image printing. Each functional part U1 to U6 in FIG. 13 is built in the arithmetic unit 391 as the printing program 393 is executed.

The layout processing part U1 arranges the images indicated by the print data received from an external computer, for example, for the printing medium WP. The print data is data that indicates the gradation value of each pixel that makes up the image in, for example, 256 steps. This layout processing part U1 determines the area of the printing medium WP where the image will be printed, as well as the correspondence between the pixels that make up the image and the nozzle 52. The tone correction part U2 adjusts the color tone of image data Di by gamma correction, for example, for the print data output from the layout processing part U1. The shading correction part U3 performs shading correction on the print data whose color tone has been adjusted by the tone correction part U2.

Thus, the image data Di described above is generated. The vibration influence determination part U4 determines whether the decimating criterion is satisfied by executing step S105 in FIG. 9. In this example, image data Di is data that indicates the gradation value of each pixel P that makes up the image, and is not data that directly indicates the size of the ink droplet that is to be ejected to each pixel P. In contrast, the Vibration Influence Judgment Unit U4 has a table showing the correspondence between gradation value and the size of the ink droplet and checks the size of the ink droplet to each pixel P based on this table.

Then, for the ink droplet size of pixel P that is determined by the vibration influence judgment part U4 to satisfy the decimating criterion, the decimate complementing process part U5 performs steps S106, S107, S109 to S112. The size of the ink droplet after each processing by the decimate complementing process partU5 is output to the halftone processing partU6. On the other hand, the ink droplet size of pixel P that is judged by the vibration influence judgment part U4 not to satisfy the decimating criterion is output from the vibration influence judgment part U4 to the halftone processing part U6 without going through the decimating complementing process part U5.

Thus, the dot data Dd is input to halftone processing partU6. This halftone processing part U6 performs halftone process on dot data Dd to generate raster data. The arithmetic unit 391 prints images on printing medium WP by controlling the ejection of the ink droplet from the nozzle 52 based on the raster data.

Figure 14A:
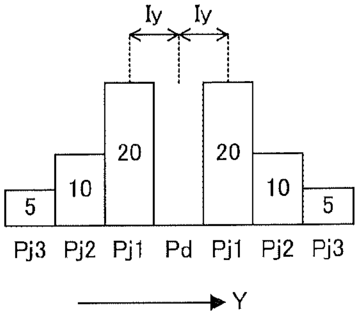
FIG. 14A shows the mask used in the first variation of the complementing process.
Figure 14B:
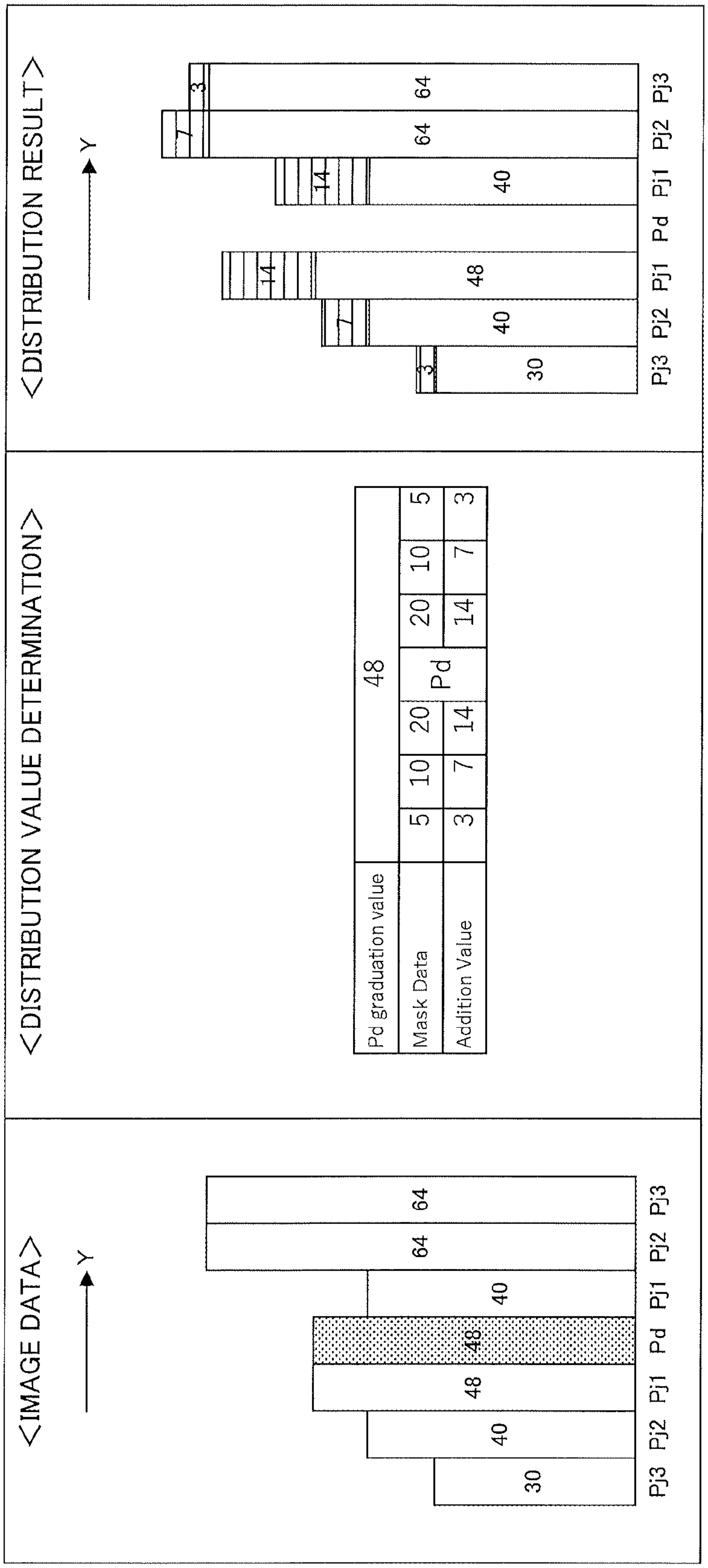
FIG. 14B shows the image processing performed in the first variation of the complementing process.

Further, the specific manner of the complementing process in step S111 of FIG. 9 may be modified as follows. FIG. 14A shows the mask used in the first variation of the complementing process, and FIG. 14B shows the image processing performed in the first variation of the complementing process. The mask in FIG. 14A distributes the gradation value of the decimated pixel Pd to the pixels Pj1, Pj2, and Pj3 adjacent to the decimated pixel Pd in the Y direction. Here, for pitch Iy, where pixel P is aligned in the Y direction, the adjacent pixel Pj1 (primary adjacent pixel) and the decimated pixel Pd are aligned at pitch Iy times 1, the adjacent pixel Pj2 (secondary adjacent pixel) and the decimated pixel Pd are aligned at pitch Iy times 2, the adjacent pixel Pj3 (tertiary adjacent pixel) and the decimated pixel Pd are aligned at pitch Iy times 3.

The numerical values of the bars corresponding to adjacent pixelPj1, Pj2, and Pj3 indicate the ratio of distributing the gradation value Vd of the decimated pixel Pd (i.e., the gradation value that was set for the decimated pixel Pd before the decimating process) to the corresponding adjacent pixelsPj1, Pj2, and Pj3. The values of the adjacent pixel Pj1, Pj2 and Pj3, respectively, are 70 (=20+20+10+10+5+5). Therefore, gradation value Vd×20/70 is distributed to adjacent pixel Pj1, gradation value Vd×10/70 is distributed to adjacent pixel Pj2, and gradation value Vd×5/70 is distributed to adjacent pixel Pj3.

"Distribution Value Determination" column in FIG. 14B shows the result of determining the gradation value to be distributed based on the mask in FIG. 14A for image data Di with gradation value Vd of 48 shown in the "Image Data" column in FIG. 14B. As shown in this column, 14, 7, and 3 are distributed to the adjacent pixelPj1, Pj2, and Pj3, respectively, as added values. The "Distribution Result" column in FIG. 14B shows the result of adding the added value to the respective gradation values for adjacent pixels Pj1, Pj2, and Pj3. In the same column, the values shown in the white bars are the gradation values of adjacent pixels Pj1, Pj2, and Pj3, the values shown in the hatched bars are the distribution and addition values. As in the example above, the gradation value of the decimated pixel Pd is set to zero.

Variations other than those listed above may be added as appropriate. For example, in the image printing of FIG. 9, it is not necessary to execute steps S102 to S112 (decimating process and complementing process) for all pixel P that make up image data Di. For example, the distribution of dots (ink droplets) in image data Di may be checked and steps S102 to S112 may be performed limited to the area where dots are concentrated.

The complementing process described above is not mandatory, the complementing process may not be necessary if the ink volume shortage caused by the decimating process is not noticeable.

In the above example, the combination of ink droplet sizes that have a significant effect from the residual vibration is adopted as the decimating criterion. However, specific examples of decimating criterion are not limited to this. That is, a combination of link droplet sizes that have a moderate or significant effect from the residual vibration may be adopted as the decimating criterion.

In the decimating process (step S106), it is not necessary to set the ink size of the decimated pixel Pd to zero, it is sufficient to reduce the ink size. Reducing the ink size can be performed by, for example, reducing the ink size by one step.

Specific examples of "ejection condition" is not limited to the size (amount) of the ink droplet described above. For example, if the effect of residual vibration becomes more pronounced due to the combination of other conditions for ejecting the ink at timingT1 and other condition for ejecting the ink at timingT2, then said other conditions should be adopted instead of the size of the ink droplet.

The specific waveforms of the ejection signals Sd(s), Sd(m), and Sd(s) are not limited to the example in FIG. 5. Furthermore, the types of ejection signal Sd are not limited to three types. For example, if the ink size is changed in four or more steps, the corresponding type of ejection signal Sd should be used.

The method of ejecting the ink is not limited to the method by piezoelectric element 55 described above.

The specific mechanism for moving the printing medium WP relative to the ejection head 5 is not limited to the above example. That is, instead of conveying the printing medium WP by driven roller 7, multiple conveyance rollers 9 and driven roller 11, ejection head 5 may be moved by a carriage.

The material of the printing medium WP described above was continuous paper, but it is not limited to that. For example, it can be sheet paper. The material of the printing medium is not necessarily limited to paper but can be a film such as OPP (oriented polypropylene) or PET (polyethylene terephthalate), for example.

INDUSTRIAL APPLICABILITY

The invention is applicable to all inkjet technologies that control the amount of ink droplet ejected from the nozzle.

REFERENCE SIGN

3 . . . printing apparatus
39 . . . control unit (computer)
393 . . . printing program
399 . . . recording medium
5 . . . ejection head
52 . . . nozzle
N1 . . . nozzle (adjacent nozzle)
N2 . . . nozzle
N3 . . . nozzle (adjacent nozzle)
Di . . . image data (ejection data)
P . . . pixel
Pt . . . target pixel
Pj . . . adjacent pixel
T1 . . . timing (first timing)
T2 . . . timing (second timing)
S105-S106 . . . step (decision process)

The invention claimed is:

1. A printing apparatus, comprising:

an ejection head ejecting an ink droplet from a nozzle; and a control unit that controls the ejection of the ink droplet from the nozzle based on ejection data indicating an ejection condition for ejecting the ink droplet from the nozzle to a target pixel to which the nozzle faces among pixels arranged at a pitch corresponding to a resolution, wherein the control unit performs a decision process to determine an amount of an ink droplet ejected by the nozzle at a second timing based on a comparison between i) a first ejection condition which is the ejection condition when the nozzle ejects a droplet at a first timing and ii) a second ejection condition which is the ejection condition when the nozzle ejects a droplet at the second timing after a time corresponding to the resolution has elapsed from the first timing, wherein the control unit stores a first reducing criterion and a second reducing criterion for reducing the amount of the ink droplet ejected from the nozzle to the target pixel at the second timing from an amount indicated by the ejection data, and determines to reduce the amount of the ink droplet ejected by the nozzle at the second timing based on a result of the comparison between the first ejection condition and the second ejection condition satisfies one of the first reducing criterion and the second reducing criterion, wherein the ejection data indicates a size of the ink droplet as the ejection condition, the size of the ink droplet being selected from an S size, an M size larger than the S size, and an L size larger than the M size, wherein the first reducing criterion is that the ejection data indicates that the size of the ink droplet ejected at the first timing is the L size and the size of the ink droplet ejected at the second timing is the M size, and wherein the second reducing criterion is that the ejection data indicates that the size of the ink droplet ejected at the first timing is the L size and the size of the ink droplet ejected at the second timing is the L size.

2. The printing apparatus according to claim 1, wherein the control unit determines to set the amount of the ink droplet ejected by the nozzle at the second timing to zero based on the result of the comparison between the first ejection condition and the second ejection condition satisfies the one of the first reducing criterion and the second reducing criterion in the decision process.

3. The printing apparatus according to claim 1, wherein the ejection condition indicates the amount of the ink droplet ejected from the nozzle to the target pixel.

4. The printing apparatus according to claim 1, wherein in the decision process, the control unit determines the amount of the ink droplet that is ejected by the nozzle at the second timing based on the comparison between the first ejection condition and the second ejection condition and an ink temperature.

5. A printing apparatus comprising:

an ejection head ejecting an ink droplet from a nozzle; and a control unit that controls the ejection of an ink droplet from the nozzle based on ejection data indicating ejection condition for ejecting an ink droplet from the nozzle to a target pixel to which the nozzle faces among pixels arranged at a pitch corresponding to a resolution, wherein the control unit performs a decision process to determine an amount of an ink droplet ejected by the nozzle at a second timing based on a comparison between i) a first ejection condition which is the ejection condition when the nozzle ejects a droplet at a first timing and ii) a second ejection condition which is the ejection condition when the nozzle ejects a droplet at the second timing after a time corresponding to the resolution has elapsed from the first timing, wherein the control unit stores a reducing criterion for reducing the amount of the ink droplet ejected from the nozzle to the target pixel at the second timing from an amount indicated by the ejection data, and determines to reduce the amount of the ink droplet ejected by the nozzle at the second timing based on a result of the comparison between the first ejection condition and the second ejection condition satisfies the reducing criterion in the decision process, wherein, in the ejection head, a plurality of nozzles is provided, including the nozzle, and the nozzles eject ink droplets at different positions from each other, and wherein when it is decided in the decision process to reduce the amount of the ink droplet that is ejected by the nozzle at the second timing, the control unit increases the amount of the ink droplet ejected from an adjacent nozzle of the plurality of nozzles facing an adjacent pixel, which is a pixel adjacent to the target pixel, to the adjacent pixel from an amount indicated by the ejection data.

6. A printing apparatus comprising:

an ejection head ejecting an ink droplet from a nozzle; and a control unit that controls the ejection of an ink droplet from the nozzle based on ejection data indicating ejection condition for ejecting the ink droplet from the nozzle to a target pixel to which the nozzle faces among pixels arranged at a pitch corresponding to a resolution, wherein the control unit performs a decision process to determine an amount of an ink droplet ejected by the nozzle at a second timing based on a comparison between i) a first ejection condition which is the ejection condition when the nozzle ejects a droplet at a first timing and ii) a second ejection condition which is the ejection condition when the nozzle ejects a droplet at the second timing after a time corresponding to the resolution has elapsed from the first timing, and wherein, in the decision process, the control unit determines the amount of the ink droplet that is ejected by the nozzle at the second timing based on the comparison of the first ejection condition and the second ejection condition and a time interval between the first timing and the second timing.

7. The printing apparatus according to claim 6, wherein in the decision process, the control unit reduces the amount of the ink droplet that is ejected by the nozzle at the second timing as the time interval between the first timing and the second timing becomes shorter.

* * * * *